Dec. 21, 1937.  O. B. CLARK  2,103,063
LUBRICATING DEVICE
Filed Sept. 5, 1936　　2 Sheets-Sheet 1

INVENTOR.
OTTO B. CLARK.
BY McConkey + Booth
ATTORNEYS.

Dec. 21, 1937.    O. B. CLARK    2,103,063
LUBRICATING DEVICE
Filed Sept. 5, 1936    2 Sheets-Sheet 2

INVENTOR.
OTTO B. CLARK.
BY McConkey & Booth
ATTORNEYS.

Patented Dec. 21, 1937

2,103,063

UNITED STATES PATENT OFFICE

2,103,063

LUBRICATING DEVICE

Otto B. Clark, Chicago, Ill., assignor to The Lubrication Corporation, Chicago, Ill., a corporation of Delaware Application September 5, 1936, Serial No. 99,509

11 Claims. (Cl. 221—47.1)

This invention relates to lubricating devices and more particularly to lubricant dispensers for use with interchangeable lubricant supply cartridges.

In lubricant dispensers for use with interchangeable supply cartridges it is necessary that the cartridge be firmly secured to the dispenser with its outlet in communication with the dispenser inlet. Otherwise leakage might occur between the cartridge outlet and dispenser inlet, resulting in waste of lubricant as well as in dirtying of the dispenser and cartridge due to collection of lubricant thereon.

It is accordingly one of the objects of the invention to provide a lubricant dispenser for use with interchangeable supply cartridges in which the cartridges may be secured tightly to the dispenser.

Another object of the invention is to provide a lubricant dispenser including very simple, cheap and easily operable means to secure a lubricant supply cartridge thereto.

Another object is to provide a lubricant dispenser having pivoted pawls and cam operating means to secure a cartridge thereto.

Other objects, advantages and novel features of the invention will be apparent from the following description when read in connection with the accompanying drawings, in which.

The device illustrated on the drawings with particular reference to Figs. 1 to 4 comprises a base 1 mounted on casters 2 whereby it can easily be moved from place to place and carrying a lubricant pump indicated generally at 3. The pump is operated by any suitable power means such as a motor 4 and discharges lubricant under pressure through a flexible discharge conduit 5 which may terminate in any suitable type of nozzle, not shown, for sealing engagement with a lubricant receiving fitting.

Figure 1:
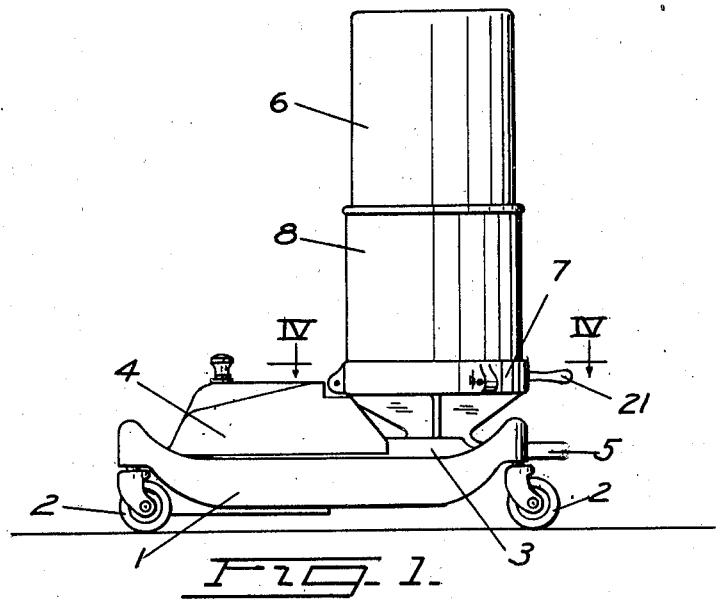
Fig. 1 is a side view of a lubricating device embodying the invention.
Figure 2:
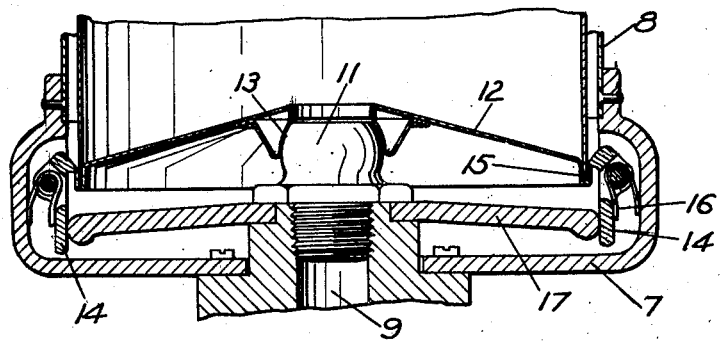
Fig. 2 is a partial central section of the device of Fig. 1 on the line II—II of Fig. 4.
Figure 3:
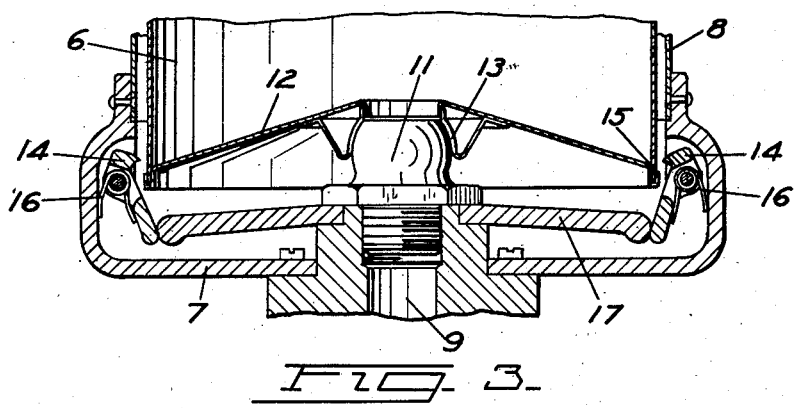
Fig. 3 is a view similar to Fig. 2 showing the parts in a different position.

Lubricant is supplied to the pump from an interchangeable factory filled lubricant cartridge 6 which is supported on the base 1 by means of a head casting 7 which carries a protective housing 8 surrounding at least a part of the cartridge. As best seen in Figs. 2 and 3 the head casting 7 is formed with a bore 9 which communicates with the pump inlet and which terminates in an inlet stud 11 having a partially spherical surface for sealing engagement with the cartridge outlet opening. Preferably the cartridge outlet opening is formed in a fixed end wall 12 of the cartridge and is defined by a spherical wall portion 13 adapted for sealing engagement with the spherical wall of the inlet stud 11.

In order to secure the cartridge firmly to the dispenser a plurality of locking pawls 14 are provided pivoted intermediate their ends to the head casting 7 and formed at one end for engagement with an annular bead 15 on the outlet end of the cartridge. Springs 16 are preferably provided to urge the pawls 14 out of engagement with the cartridge and the opposite ends of the pawls are formed for engagement with a cam disc 17.

Figure 4:
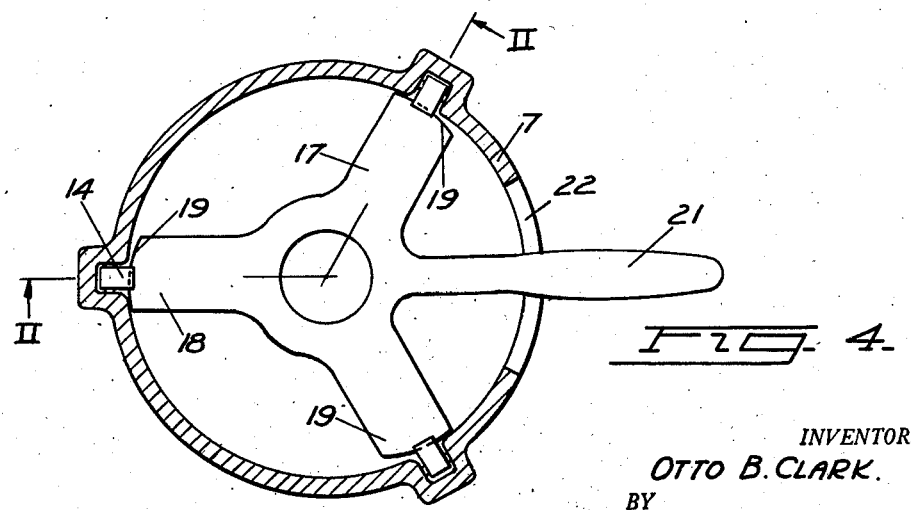
Fig. 4 is a partial section on the line IV—IV of Fig. 1.

As shown best in Fig. 4 the disc 17 is rotatably mounted co-axially with the inlet stud 11 and is cut-away to form a plurality of arms 18 corresponding in number and spacing to the number and spacing of the pawls 14. Each of the arms 18 is formed on its outer peripheral edge with a cam surface as indicated at 19 for engagement with the lower ends of the pawls 14. An operating lever 21 is secured to or formed integrally with the cam disc 17 and extends through a slot 22 in the head plate 7 whereby it may be grasped by an operator.

To connect a cartridge to the dispenser the cam plate 17 is preferably turned to the position shown in Fig. 3 in which the innermost portions of the cam surfaces 19 engage the lower ends of the pawls 14 and the pawls may be swung about their pivots by their springs 16 to move the upper ends thereof away from the cartridge. A cartridge may then be inserted in the housing 8 until its outlet opening registers with the inlet stud 11 and the walls 13 of the outlet opening sealingly engage the spherical surface of the stud. The cam plate 17 may then be rocked to the position of Fig. 2 in which the outermost parts of the cam surfaces 19 engage the lower ends of the pawls 14 and rock them about their pivots into the position of Fig. 2 in which the upper ends of the pawls engage the bead 15 to lock the cartridge firmly to the head plate. The motor 4 may then be operated to operate the pump 3 which will withdraw lubricant from the cartridge through the stud 11 and passage 9 and will eject the lubricant at high pressure through the conduit 5.

Figure 6:
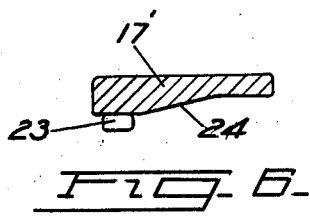
Fig. 6 is a partial section on the line VI—VI of Fig. 5.
Figure 5:
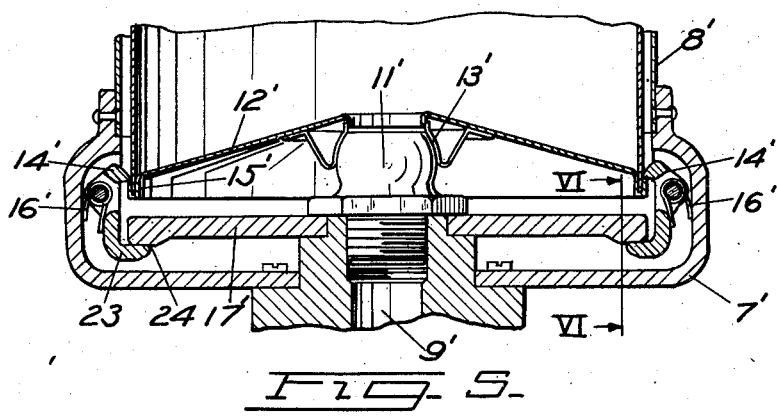
Fig. 5 is a view similar to Fig. 2 showing a modified construction.

Figs. 5 and 6 disclose a modified form of the invention, parts therein corresponding to like parts in Figs. 1 to 4 being indicated by the same reference numbers primed. In this modification the pawls 14' have their lower ends bent around to lie under the cam plate 17' as shown at 23 and the cam plate 17' is formed on its lower surface with a plurality of cam surfaces 24 adapted to engage said portions 23. It will be noted that when the plate 17' is in a position to bring the lower parts of the cam surfaces 24 into engagement with the pawl ends 23, as in Fig. 6, the pawls will be rocked into a position to engage the bead 15' on the cartridge to lock the cartridge to the dispenser. When the cam plate 17' is turned to a position with the high portions of the cams 24 in engagement with the pawl ends 23, the pawls will be swung about their pivots under the influence of springs 16' to move the upper ends thereof out of engagement with the cartridge thereby permitting easy insertion or removal of the cartridge.

While two embodiments of the invention have been shown and described in detail, it will be apparent that many changes might be made therein and it is not intended to be limited to the forms shown nor otherwise than by the terms of the appended claims.

I claim:

1. A lubricating device comprising, lubricant dispensing means, an interchangeable lubricant cartridge to supply lubricant to the dispensing means, a fastening member carried by the dispensing means and movable into and out of engagement with the cartridge to secure the cartridge to the dispensing means, a pivotally mounted disc having a cam portion engaging the fastening means to operate the same, and means for moving the disc.

2. A lubricating device comprising, lubricant dispensing means, an interchangeable lubricant cartridge to supply lubricant to the dispensing means and having a peripheral bead at one end, a latch member pivoted on the dispensing means and rockable into and out of engagement with the bead to secure the cartridge to the dispensing means, and operating means for controlling the position of the latch member about its pivot.

3. A lubricating device comprising, lubricant dispensing means, an interchangeable lubricant cartridge to supply lubricant to the dispensing means, a latch member pivoted on the dispensing means and rockable into and out of engagement with the cartridge to secure the cartridge to the dispensing means, a rotatably mounted disc having a cam portion at its periphery engageable with said latch member to operate it, and means for rotating said disc.

4. A lubricating device comprising, lubricant dispensing means, an interchangeable lubricant cartridge to supply lubricant to the dispensing means, a locking pawl pivoted intermediate its ends on the dispensing means and having one end formed for locking engagement with the cartridge to hold the cartridge on the dispensing means, and cam means engageable with the other end of the pawl to operate the same.

5. A lubricating device comprising, lubricant dispensing means, an interchangeable lubricant cartridge to supply lubricant to the dispensing means, a locking pawl pivoted intermediate its ends on the dispensing means and having one end formed for locking engagement with the cartridge to hold the cartridge on the dispensing means, a rotatably mounted disc having a cam portion at its periphery engageable with the other end of the pawl to operate the same, and means to rotate the disc.

6. A lubricating device comprising, lubricant dispensing means, an interchangeable lubricant cartridge to supply lubricant to the dispensing means, a locking pawl pivoted intermediate its ends on the dispensing means and having one end formed for locking engagement with the cartridge to hold the cartridge on the dispensing means, a flat disc having a peripheral edge portion formed as a cam to engage the other end of the pawl, said disc being rotatably mounted on the dispensing means, and means for rotating the disc.

7. A lubricating device comprising, lubricant dispensing means, an interchangeable lubricant cartridge to supply lubricant to the dispensing means, a locking pawl pivoted intermediate its ends on the dispensing means and having one end formed for locking engagement with the cartridge to hold the cartridge on the dispensing means, a flat disc having a portion of one of its surfaces adjacent its periphery formed as a cam to engage the other end of said pawl, said disc being rotatably mounted on the dispensing means, and means for rotating the disc.

8. A lubricating device comprising, lubricant dispensing means, an interchangeable lubricant cartridge having an external bead at its discharge end and adapted to supply lubricant to said dispensing means, a plurality of locking pawls pivoted intermediate their ends to the dispensing means and arranged in annular array around the cartridge, said pawls having one end formed to engage said bead to lock the cartridge to the dispensing means, and a cam member pivoted centrally of said pawls and adapted to engage the other ends of said pawls simultaneously thereby to lock the cartridge to the dispensing means or to release the cartridge as the cam is operated.

9. A lubricating device comprising, lubricant dispensing means, an interchangeable lubricant cartridge having an external bead at its discharge end and adapted to supply lubricant to said dispensing means, a plurality of locking pawls pivoted intermediate their ends to the dispensing means and arranged in annular array around the cartridge, said pawls having one end formed to engage said bead to lock the cartridge to the dispensing means, a relatively flat disc journaled on an axis central to the pawls and formed at its periphery with a plurality of cam portions engageable with the pawls to operate them simultaneously, and a lever secured to the disc to operate it.

10. A lubricating device comprising, a lubricant dispenser having an inlet opening formed for engagement with a lubricant supply cartridge, a plurality of locking members movably secured to the dispenser around the inlet opening and adapted to engage a cartridge around its periphery to secure it to the dispenser, and means carried by the dispenser for simultaneously operating said locking member.

11. A lubricating device comprising, a lubricant dispenser having an inlet opening formed for engagement with a lubricant supply cartridge, a plurality of pawls pivoted intermediate their ends to the dispenser around the inlet opening and each having one end formed to engage a cartridge to secure it to the dispenser, and a disc rotatably mounted coaxially to the inlet opening and having its periphery formed with a plurality of cam portions to engage the other ends of the pawls to operate them.

OTTO B. CLARK.